United States Patent
Lin et al.

(10) Patent No.: US 12,381,899 B2
(45) Date of Patent: Aug. 5, 2025

(54) NETWORK TRAFFIC ANOMALY DETECTION METHOD AND APPARATUS, AND ELECTRONIC APPARATUS AND STORAGE MEDIUM

(71) Applicant: DBAPPSECURITY CO., LTD, Hangzhou (CN)

(72) Inventors: Yueqing Lin, Hangzhou (CN); Yuan Fan, Hangzhou (CN); Bo Liu, Hangzhou (CN)

(73) Assignee: DBAPPSECURITY CO., LTD, Hangzhou (CN)

( * ) Notice: Subject to any disclaimer, the term of this patent is extended or adjusted under 35 U.S.C. 154(b) by 297 days.

(21) Appl. No.: 18/022,170

(22) PCT Filed: May 7, 2021

(86) PCT No.: PCT/CN2021/092227
§ 371 (c)(1),
(2) Date: Feb. 20, 2023

(87) PCT Pub. No.: WO2022/037130
PCT Pub. Date: Feb. 24, 2022

(65) Prior Publication Data
US 2023/0300159 A1      Sep. 21, 2023

(30) Foreign Application Priority Data
Aug. 21, 2020   (CN) .......................... 202010847761.6

(51) Int. Cl.
*H04L 9/40*       (2022.01)
*H04L 41/16*      (2022.01)

(52) U.S. Cl.
CPC .......... *H04L 63/1425* (2013.01); *H04L 41/16* (2013.01)

(58) Field of Classification Search
CPC ........................... H04L 63/1425; H04L 41/16
See application file for complete search history.

(56) References Cited

U.S. PATENT DOCUMENTS

| | | | |
|---|---|---|---|
| 11,057,409 B1* | 7/2021 | Bisht | .................. H04L 63/1425 |
| 2011/0026840 A1* | 2/2011 | Tao | ........................ G06V 20/35 382/224 |

(Continued)

FOREIGN PATENT DOCUMENTS

| CN | 101582813 A | 11/2009 |
|---|---|---|
| CN | 102324007 A | 1/2012 |

(Continued)

OTHER PUBLICATIONS

International Search Report of PCT/CN2021/092227.
China Office Action of 202010847761.6.

*Primary Examiner* — Nam T Tran

(57) ABSTRACT

A network traffic anomaly detection method and apparatus, and an electronic apparatus and a storage medium are provided. The network traffic anomaly detection method includes: acquiring multiple segments of traffic data in different monitoring states; acquiring an anomaly feature vector from the multiple segments of traffic data; training an initial classification model according to the anomaly feature vector and on the basis of a KNN algorithm, so as to obtain multiple initial classifiers; training an initial Adaboost classification model according to the anomaly feature vector and the multiple initial classifiers and on the basis of an Adaboost algorithm, so as to obtain an Adaboost classifier; and classifying collected traffic data via the Adaboost classifier.

13 Claims, 3 Drawing Sheets

(56) References Cited

U.S. PATENT DOCUMENTS

| | | | | |
|---|---|---|---|---|
| 2015/0229662 A1* | 8/2015 | Hitt | ............... | H04L 63/1425 |
| | | | | 726/23 |
| 2019/0354388 A1* | 11/2019 | Mitra | ............... | G06N 20/00 |
| 2021/0235293 A1* | 7/2021 | Chen | ............... | G06N 20/20 |

FOREIGN PATENT DOCUMENTS

| | | |
|---|---|---|
| CN | 103716204 A | 4/2014 |
| CN | 108093406 A | 5/2018 |
| CN | 112153000 A | 12/2020 |

* cited by examiner

NETWORK TRAFFIC ANOMALY DETECTION METHOD AND APPARATUS, AND ELECTRONIC APPARATUS AND STORAGE MEDIUM

CROSS-REFERENCE TO RELATED APPLICATIONS

This application is a U.S. national phase application under 35 U.S.C. § 371 base upon international patent application No. PCT/CN2021/092227, filed on May 7, 2021, titled "NETWORK TRAFFIC ANOMALY DETECTION METHOD AND APPARATUS, AND ELECTRONIC APPARATUS AND STORAGE MEDIUM", which itself claims all benefits accruing from China Patent Application No. 202010847761.6, filed on Aug. 21, 2020, titled "NETWORK TRAFFIC ANOMALY DETECTION METHOD AND APPARATUS, AND ELECTRONIC APPARATUS AND STORAGE MEDIUM" in the China National Intellectual Property Administration, both of which are hereby incorporated by reference.

TECHNICAL FIELD

The present disclosure relates to the field of data processing, and in particular, to a network traffic anomaly detection method and apparatus, and an electronic apparatus and a storage medium.

BACKGROUND

A network traffic anomaly refers to a situation where a network traffic behavior deviates from a normal behavior. The network traffic anomaly not only affects a normal use of the network and a business system, but also threatens information security of network users, causing many hazards to the network users. Many abnormal behaviors in a computer network may be timely found by categorizing and monitoring different traffic in the network, and the abnormal behaviors may be controlled in a targeted manner to effectively ensure a normal operation of the computer network. Therefore, detecting abnormal traffic is an important aspect of network operation and maintenance. It plays a crucial role in the sustainable and normal development of the network that how to effectively diagnose abnormal network traffic to ensure network availability and smoothness.

At present, a technical implementation of a detection method for abnormal traffic includes the following three ways: (1) a fixed threshold detection method: an overall operation is relatively simple mainly with help of quantitative analysis methods, but network managers are required to combine a corresponding threshold with a practical situation, and a wealth of theoretical knowledge and management experience are required. (2) a statistical detection method: a statistical analysis for judgment is completed with help of data, only a network traffic anomaly is detected, a property of the network traffic anomaly is not clarified, and the method is only for a non-real-time network traffic anomaly detection. (3) a SNMP-based detection method: a detection of the network traffic anomaly is completed mainly with help of software, but complex network traffic cannot be detected.

In the related technology, in order to improve detection effect of the network traffic anomaly, firstly, an initial classification model is trained by using initial labeled data as training samples and supervised learning. Then, the initial classification model is used to classify unlabeled data of the network traffic to obtain initial classification data. After that, the initial classification data is relabeled and corrected by using a semi-supervised learning model. Finally, the classification model is retrained with new classification data and the initial classification model is updated, and so on and so forth in a way that the classification model is continuously updated to improve the detection effect. However, in a research process, it is found that the above approach requires constant labeling and correction, resulting in a cumbersome process of detecting the network traffic anomaly and low detection effect of the network traffic anomaly.

For the issue of low detection effect of the network traffic anomaly, no effective solution has been proposed.

SUMMARY

The present disclosure provides a network traffic anomaly detection method and apparatus, and an electronic apparatus and a storage medium, which can solve a problem of low detection effect of the network traffic anomaly in related art.

In a first aspect, the present disclosure provides a network traffic anomaly detection method, including: acquiring a plurality of segments of traffic data in different monitoring states; acquiring an anomaly feature vector from the plurality of segments of traffic data; training an initial classification model according to the anomaly feature vector and on a basis of a KNN algorithm, so as to obtain a plurality of initial classifiers; training an initial Adaboost classification model according to the anomaly feature vector and the plurality of initial classifiers and on a basis of an Adaboost algorithm, so as to obtain an Adaboost classifier; and classifying collected traffic data via the Adaboost classifier.

In an embodiment, the acquiring the anomaly feature vector from the plurality of segments of traffic data further includes: determining and flagging traffic anomaly data in the plurality of segments of traffic data; determining feature data of the traffic anomaly data after being flagged; and generating the anomaly feature vector from the plurality of segments of traffic data according to the feature data.

In an embodiment, the training the initial classification model according to the anomaly feature vector and on the basis of the KNN algorithm, so as to obtain the plurality of initial classifiers further includes: taking first anomaly feature vectors as a training set, wherein the number of the first anomaly feature vectors is a first preset threshold; performing a data normalization process on the anomaly feature vectors in the training set; determining distances among the anomaly feature vectors in the training set after performing the data normalization process; and training the initial classification model according to the distances and the KNN algorithm, so as to obtain the plurality of initial classifiers.

In an embodiment, the performing the data normalization process on the anomaly feature vectors in the training set further includes: mapping the anomaly feature vectors in the training set in a range between 0 and 1 with a most-valued normalization.

In an embodiment, after the training the initial classification model according to the distances and the KNN algorithm, so as to obtain the plurality of initial classifiers, the method further includes: taking second anomaly feature vectors as a testing set, wherein the number of the second anomaly feature vectors is a second preset threshold; inputting the testing set into the plurality of initial classifiers, respectively, to obtain a classification result corresponding to each initial classifier; determining an accuracy rate of the classification result corresponding to each initial classifier; determining whether the accuracy rate of the classification result corresponding to each initial classifier is greater than a third preset threshold, if no, acquiring first initial classifiers corresponding to which the accuracy rate is not greater than the third preset threshold; and training the first initial classifiers according to the distances and the KNN algorithm.

In an embodiment, the training the initial Adaboost classification model according to the anomaly feature vector and the plurality of initial classifiers and on the basis of the Adaboost algorithm, so as to obtain the Adaboost classifier further includes: taking third anomaly feature vectors as a training group, wherein the number of the third anomaly feature vectors is a fourth preset threshold; inputting the training group into the plurality of initial classifiers, respectively, to calculate an error of each initial classifier; determining a weight of each initial classifier according to the error of each initial classifier; training the initial classifiers corresponding to the weight according to the weight of each initial classifier until convergence; and inputting the initial classifiers after training into the Adaboost classification model, so as to obtain an Adaboost classifier.

In an embodiment, the determining a weight of each initial classifier according to the error of each initial classifier further includes: initializing each initial classifier; assigning preset values to each initial classifier after initialization, respectively; and determining the weight of each initial classifier according to the error of each initial classifier.

In a second aspect, the present disclosure further provides a network traffic anomaly detection apparatus, including a first acquiring module, a second acquiring module, a first training module, a second training module, and a classifying module. The first acquiring module is configured for acquiring a plurality of segments of traffic data in different monitoring states.

The second acquiring module is configured for acquiring an anomaly feature vector from the plurality of segments of traffic data. The first training module is configured for training an initial classification model according to the anomaly feature vector and on a basis of a KNN algorithm, so as to obtain a plurality of initial classifiers. The second training module is configured for training an initial Adaboost classification model according to the anomaly feature vector and the plurality of initial classifiers and on a basis of an Adaboost algorithm, so as to obtain an Adaboost classifier. The classifying module is configured for classifying collected traffic data via the Adaboost classifier.

In a third aspect, the present disclosure further provides an electronic apparatus, including a processor and a memory that stores a computer program running on the processor, and the computer program is executed by the processor to implement the steps of the above network traffic anomaly detection method.

In a fourth aspect, the present disclosure further provides a storage medium having stored a computer program, and the computer program is executed by a processor to implement the steps of the above network traffic anomaly detection method.

In contrast to the related art, the present disclosure provides the network traffic anomaly detection method and apparatus, and the apparatus and the storage medium. The plurality of segments of traffic data in different monitoring states are acquired. The anomaly feature vector is acquired from the plurality of segments of traffic data. The initial classification model is trained according to the anomaly feature vector and on the basis of the KNN algorithm, so as to obtain the plurality of initial classifiers. The initial Adaboost classification model is trained according to the anomaly feature vector and the plurality of initial classifiers and on the basis of the Adaboost algorithm, so as to obtain the Adaboost classifier. The collected traffic data is classified via the Adaboost classifier. The above solution solves the problem of low detection effect of the network traffic anomaly in related art, and improves detection accuracy of the network traffic anomaly.

The details of one or more embodiments of the present disclosure are set forth in the accompanying drawings and the description below. Other features, objects and advantages of the present disclosure will become apparent from the description and drawings.

BRIEF DESCRIPTION OF THE DRAWINGS

The drawings illustrated herein are used to provide a further understanding of the present disclosure, constituting part of the present disclosure. Illustrative embodiments of the present disclosure and its description used for explain the present disclosure, are not construed as an undue qualification of the present disclosure. In the drawings.

DETAILED DESCRIPTION

Figure 1:
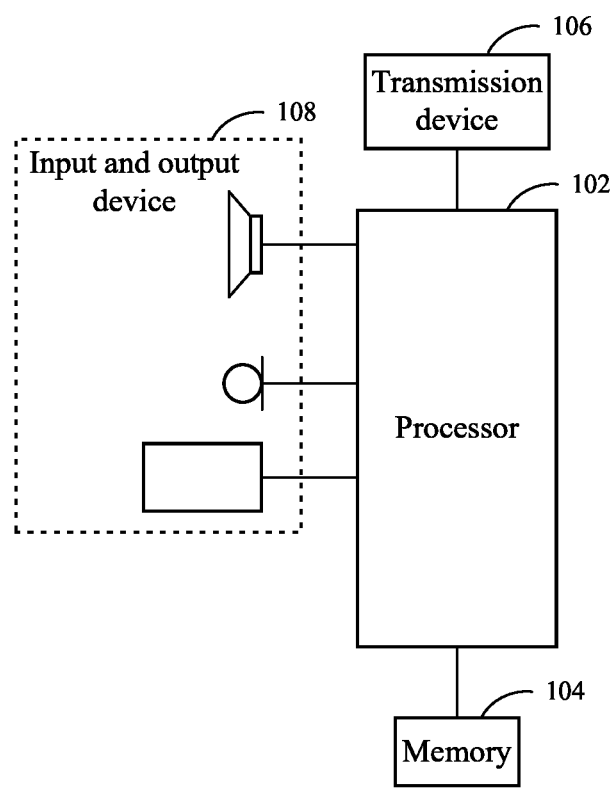
FIG. 1 is a block diagram of a hardware structure of a terminal of a network traffic anomaly detection method in an embodiment of the present disclosure.

In order to make objects, technical solutions and advantages of the present disclosure more clearly understood, the present disclosure is described and illustrated in the following with reference to the accompanying drawings and embodiments. It should be understood that specific embodiments described herein are only used to explain the present disclosure and not intended to limit the present disclosure. All other embodiments obtained by those skilled in the art based on the embodiments of the present disclosure without making creative labor are within the scope of the present disclosure. It is also understood that although the efforts made in such development process may be complex and lengthy, some changes in design, manufacture or production based on the technical content disclosed in the present disclosure are only conventional technical means to those skilled in the art related to the content disclosed in the present disclosure and should not be construed as inadequate for the content disclosed in the present disclosure.

The reference to "embodiment" in the present disclosure means that with reference to the particular features, structures or characteristics described in the embodiments may be included in at least one embodiment of the present disclosure. The phrase "embodiment" appears in various positions in the description does not necessarily refer to the same embodiment, nor is it a separate or embodiment that is mutually exclusive with other embodiments. It can be expressly and implicitly understood by those skilled in the art that the embodiments described in the present disclosure may be combined with other embodiments in the absence of conflict.

Unless otherwise defined, all technical and scientific terms used herein have the same meaning as a skilled person in the art would understand. The term "one", "a", "an", "the"

and other similar words as used in the present disclosure do not indicate quantitative limitations, and they can be singular or plural. The terms "include", "comprise", "have", and any variation thereof, as used in the present disclosure, are intended to cover a non-exclusive inclusion. For example, processes, methods, systems, products, or devices including a series of steps or modules (units) are not limited to listed steps or units, but may include steps or units not listed, or may include other steps or units inherent in those processes, methods, products, or devices. The terms "connection", "connected", "coupling", and other similar words as used in the present disclosure are not limited to physical or mechanical connections, but may include electrical connections, which can be direct connections or indirect connections. The term "plurality" in the present disclosure refers to two or more. "And/or" describes an association relationship between associated objects, indicating that there can be three kinds of relationships. For example, "A and/or B" can mean that A exists alone, A and B exist at the same time, and B exists alone. The character "/" indicates that the objects associated with each other are in an "or" relationship. The terms "first", "second", "third", etc. involved in the present disclosure are only configured for distinguishing similar objects, and do not represent a specific order of the objects.

A method provided in the present disclosure may be executed in a terminal, a computer, or a similar computer device. As an example of running on a terminal, FIG. 1 is a block diagram of a hardware structure of a terminal of a network traffic anomaly detection method in an embodiment of the present disclosure. Referring to FIG. 1, a terminal 10 may include one or more processors 102 (only one is shown in FIG. 1, and the processor 102 may include, but is not limited to, a processing device such as a Microcontroller Unit (MCU), or a Field Programmable Gate Array (FPGA)) and a memory 104 configured for storing data. Alternatively, the above terminal may further include a transmission device 106 configured for communication functions and an input and output device 108. Those skilled in the art may understand that the structure shown in FIG. 1 is only schematic, and it does not limit the structure of the terminal. For example, the terminal 10 may also include more or fewer components than that shown in FIG. 1, or has a different configuration from that shown in FIG. 1.

The memory 104 may be configured to store a computer program, such as a software program and module of application software. For example, the computer program corresponding to the network traffic anomaly detection method in an embodiment of the present disclosure may be stored in the memory 104. The computer program may be executed by the processor 102 to perform various functional applications as well as data processing, i.e., to implement the above network traffic anomaly detection method. The memory 104 may include a high-speed random memory, and may also include a non-volatile memory such as one or more magnetic storage devices, flash memories, or other non-volatile solid state memories. In some embodiments, the memory 104 may further include memories that are remotely located relative to the processor 102, and these remote memories may be connected to the terminal 10 via a network. Examples of the above network may include, but are not limited to, the Internet, a corporate intranet, a local area network, a mobile communication network, and combinations thereof.

The transmission device 106 is configured to receive or send data via a network. Specific examples of the described network may include a wireless network provided by a communication provider of the terminal 10. In an embodiment, the transmission device 106 may include a network interface controller (NIC) that may be connected to other network devices via a base station to communicate with the Internet. In an embodiment, the transmission device 106 may include a Radio Frequency (RF) module, which is configured to communicate with the Internet by a wireless manner.

Figure 2:
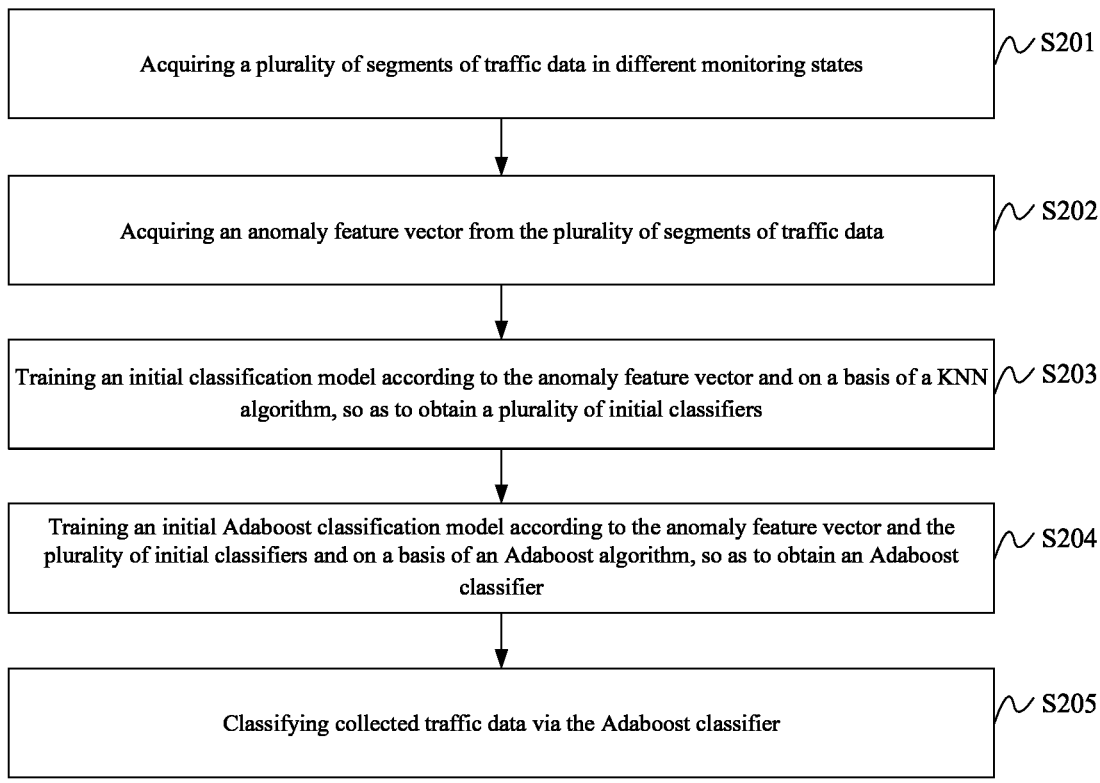
FIG. 2 is a flowchart of a network traffic anomaly detection method in an embodiment of the present disclosure.

The present disclosure provides a network traffic anomaly detection method. FIG. 2 is a flowchart of the network traffic anomaly detection method in an embodiment of the present disclosure. Referring to FIG. 2, the flowchart may include step 201 to step 205.

Step 201 includes acquiring a plurality of segments of traffic data in different monitoring states.

In the present step, the plurality of segments of traffic data may be acquired in real time, or in databases corresponding to the plurality of segments of traffic data, respectively.

Step 202 includes acquiring an anomaly feature vector from the plurality of segments of traffic data.

In some embodiments, traffic anomaly data in the plurality of segments of traffic data may be determined first and flagged, feature data of the traffic anomaly data after being flagged may be determined, and the anomaly feature vector may be generated from the plurality of segments of traffic data according to the feature data. In this way, a way to acquire the anomaly feature vector is provided.

Step 203 includes training an initial classification model according to the anomaly feature vector and on a basis of a KNN algorithm, so as to obtain a plurality of initial classifiers.

In the present step, the KNN algorithm, also known as a neighbor algorithm, or a K-Nearest Neighbor (KNN) classification algorithm, may be one of the simplest methods in data mining classification techniques. The KNN means K nearest neighbors. In other words, each sample may be represented by nearest K neighboring values. The neighbor algorithm may be a method of classifying each record in a data set.

In some embodiments, the step 203 may be implemented in the following manner. First anomaly feature vectors may be taken as a training set, and the number of the first anomaly feature vectors may be a first preset threshold. A data normalization process may be performed on the anomaly feature vectors in the training set. Distances among the anomaly feature vectors in the training set after performing the data normalization process may be determined. The initial classification model may be trained according to the distances and the KNN algorithm, so as to obtain the plurality of initial classifiers.

In the present embodiment, the data normalization process on the anomaly feature vectors in the training set may include: mapping the anomaly feature vectors in the training set in a range between 0 and 1 with a most-valued normalization. In this way, the features of different dimensions may be in the same space, which facilitates improving the detection effect of the network traffic anomaly.

Based on the above embodiments, after the initial classification model is trained according to the distances and the KNN algorithm, so as to obtain the plurality of initial classifiers, second anomaly feature vectors may be taken as a testing set, and the number of the second anomaly feature vectors may be a second preset threshold. The testing set may be input into the plurality of initial classifiers, respectively, to obtain a classification result corresponding to each initial classifier. An accuracy rate of the classification result corresponding to each initial classifier may be determined. It may be determined that whether the accuracy rate of the classification result corresponding to each initial classifier is greater than a third preset threshold, if no, first initial classifiers may be acquired corresponding to which the accuracy rate is not greater than the third preset threshold. The first initial classifiers may be trained according to the distances and the KNN algorithm. In this way, the detection of the initial classifiers may be implemented, which facilitates improving detection effect and accuracy of the initial classifiers.

Step 204 includes training an initial Adaboost classification model according to the anomaly feature vector and the plurality of initial classifiers and on a basis of an Adaboost algorithm, so as to obtain an Adaboost classifier.

In the present step, the Adaboost algorithm may be an iterative algorithm, a core idea of which is to train different classifiers (weak classifiers) for the same training set, and then aggregate these weak classifiers to form a stronger final classifier (a strong classifier).

In some embodiments, the step 204 may be implemented by the following steps. Third anomaly feature vectors may be taken as a training group, and the number of the third anomaly feature vectors may be a fourth preset threshold. The training group may be input into the plurality of initial classifiers, respectively, to calculate an error of each initial classifier. A weight of each initial classifier may be determined according to the error of each initial classifier. The initial classifiers corresponding to the weight may be trained according to the weight of each initial classifier until convergence. The initial classifiers after training may be input into the Adaboost classification model, so as to obtain an Adaboost classifier. In this way, a training of the Adaboost classifier may be achieved.

In the present embodiment, determining the weight of each initial classifier according to the error of each initial classifier may include: initializing each initial classifier; assigning preset values to each initial classifier after initialization, respectively; and determining the weight of each initial classifier according to the error of each initial classifier. In this way, an initial assignment of each initial classifier may be ensured to be consistent, facilitating improving detection effect of the initial classifier.

Step 205 includes classifying collected traffic data via the Adaboost classifier.

Based on the step 201 to the step 205, the plurality of segments of traffic data in different monitoring states may be acquired. Multiple sets of traffic anomaly feature vectors may be acquired from the plurality of segments of traffic data. The plurality of initial classifiers may be trained according to the multiple sets of traffic anomaly feature vectors and on the basis of the KNN algorithm, so as to obtain the plurality of initial classifiers. An Adaboost strong classifier may be obtained by combining the plurality of initial classifiers, and the Adaboost strong classifier may be configured to classify collected network traffic anomaly data, so as to improve the detection effect and solve the problem of low detection effect of the network traffic anomaly in related art.

Moreover, an Adaboost network traffic anomaly detection method based on KNN in the present disclosure may determine and classify anomalies based on a large amount of traffic monitoring data. The method may detect complexified network traffic and is adaptive, facilitating improving detection accuracy of the traffic anomaly.

Embodiments of the present disclosure are described and illustrated below by means of alternative embodiments.

Figure 3:
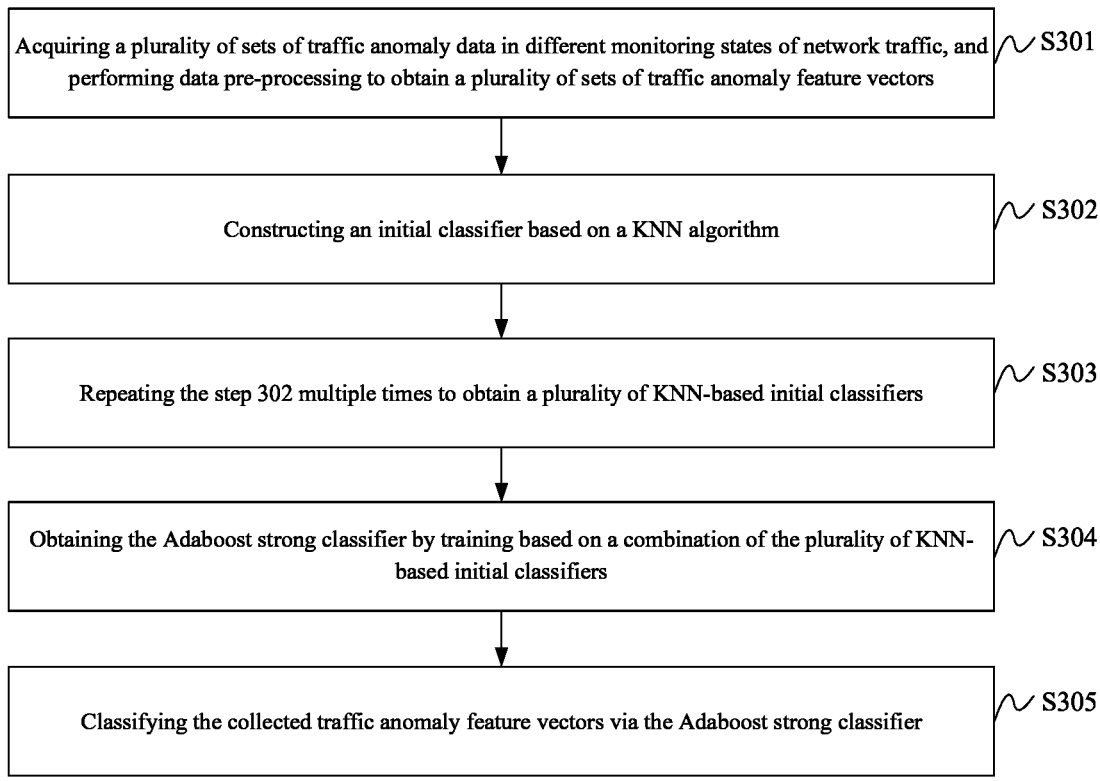
FIG. 3 is a flowchart of a network traffic anomaly detection method in an alternative embodiment of the present disclosure.

FIG. 3 is a flowchart of a network traffic anomaly detection method in an alternative embodiment of the present disclosure. Referring to FIG. 3, alternative processes may include step 301 to step 305.

Step 301 may include acquiring a plurality of sets of traffic anomaly data in different monitoring states of network traffic, and performing data pre-processing to obtain a plurality of sets of traffic anomaly feature vectors.

The step 301 may be performed in accordance with the following steps:
(1) acquiring and labeling the plurality of sets of traffic anomaly data in different monitoring states of network traffic;
(2) extracting feature data of the traffic anomaly data by a traffic feature extraction tool; and
(3) generating the feature vectors based on the feature data.

Step 302 may include constructing an initial classifier based on a KNN algorithm.

The step 302 may be performed in accordance with the following steps:
(1) data set partitioning: randomly taking 80% of sets of the traffic anomaly feature vectors as a training set and the remaining 20% of sets of the traffic anomaly feature vectors as a test set;
(2) data normalization processing: normalizing the traffic anomaly feature vectors by a linear function transformation to map all data in a range between 0 and 1, ensuring that features in different dimensions are in the same space;
(3) initial classification model training: calculating distances among training data by a weighted Euclidean distance formula, and constructing the initial classification model based on the KNN algorithm: marking the nearest k neighbor training samples as the same category; and
(4) initial classification model testing: inputting the test set into the initial classification model, judging accuracy of the initial classification model according to output results and labeling results, if initial accuracy is not less than a set value, taking the initial classification model as the initial classifier, if the initial accuracy is less than the set value, repeating the above step (3) for optimizing initial classification model.

Step 303 may include repeating the step 302 multiple times to obtain a plurality of KNN-based initial classifiers.

Step 304 may include obtaining the Adaboost strong classifier by training based on a combination of the plurality of KNN-based initial classifiers.

The step 304 may be performed in accordance with the following steps:
(1) classifying a plurality of sets of the traffic anomaly feature vectors, randomly taking 70% of sets of the traffic anomaly feature vectors as a training group and the remaining 30% of the sets of the traffic anomaly feature vectors as a test group;
(2) inputting the training group and the plurality of initial classifiers into the Adaboost classifier;
(3) initializing the weight of each initial classifier and assigning the same weight to each KNN-based initial classifier;
(4) inputting the training group into each initial classifier and calculate the error of each initial classifier;
(5) calculating the weight of each initial classifier; and
(6) updating the weight of each initial classifier, determining whether a current iteration number is less than a set iteration number, if yes, repeating the step (4) to the step (6) until the current iteration number is not less than the set iteration number; if no, combining the plurality of initial classifiers into the Adaboost strong classifier.

Step 305 may include classifying the collected traffic anomaly feature vectors via the Adaboost strong classifier.

The present disclosure further provides a network traffic anomaly detection apparatus, which is configured to realize the above embodiments and alternative embodiments, which have been described without further elaboration. As used below, the terms "module", "unit", "subunit", etc. may be a combination of software and/or hardware that implements a preset function. Although the apparatus described in the following embodiments are preferably implemented in software, implementations of hardware, or combinations of software and hardware, are also possible and contemplated.

Figure 4:
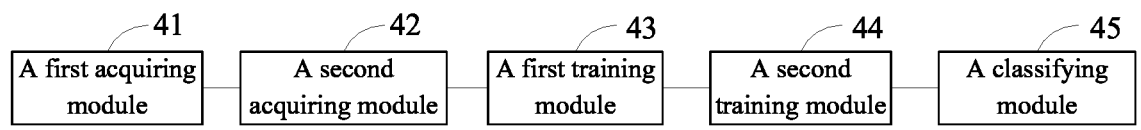
FIG. 4 is a block diagram of a network traffic anomaly detection apparatus in an embodiment of the present disclosure.

FIG. 4 is a block diagram of the network traffic anomaly detection apparatus in an embodiment of the present disclosure. Referring to FIG. 4, the apparatus may include a first acquiring module 41, a second acquiring module 42, a first training module 43, a second training module 44, and a classifying module 45. The first acquiring module 41 is configured for acquiring a plurality of segments of traffic data in different monitoring states. The second acquiring module 42, coupled to the first acquiring module 41, is configured for acquiring an anomaly feature vector from the plurality of segments of traffic data. The first training module 43, coupled to the second acquiring module 42, is configured for training an initial classification model according to the anomaly feature vector and on a basis of a KNN algorithm, so as to obtain a plurality of initial classifiers. The second training module 44, coupled to the first training module 43, is configured for training an initial Adaboost classification model according to the anomaly feature vector and the plurality of initial classifiers and on a basis of an Adaboost algorithm, so as to obtain an Adaboost classifier. The classifying module 45, coupled to the second training module 44, is configured for classifying collected traffic data via the Adaboost classifier.

In the present embodiment, the first acquiring module 41 is configured for acquiring the plurality of segments of traffic data in different monitoring states. The second acquiring module 42, coupled to the first acquiring module 41, is configured for acquiring the anomaly feature vector from the plurality of segments of traffic data. The first training module 43, coupled to the second acquiring module 42, is configured for training the initial classification model according to the anomaly feature vector and on the basis of the KNN algorithm, so as to obtain the plurality of initial classifiers. The second training module 44, coupled to the first training module 43, is configured for training the initial Adaboost classification model according to the anomaly feature vector and the plurality of initial classifiers and on the basis of an Adaboost algorithm, so as to obtain the Adaboost classifier. The classifying module 45, coupled to the second training module 44, is configured for classifying collected traffic data via the Adaboost classifier. In this way, the problem of low detection effect of the network traffic anomaly in related art may be solved, improving detection accuracy of the network traffic anomaly.

In some embodiments, the second acquiring module 42 may include a first determining unit, a second determining unit, and a generating unit. The first determining unit is configured for determining and flagging traffic anomaly data in the plurality of segments of traffic data. The second determining unit is configured for determining feature data of the traffic anomaly data after being flagged. The generating unit is configured for generating the anomaly feature vector from the plurality of segments of traffic data according to the feature data.

In some embodiments, the first training module 43 may include a first taking unit, a processing unit, a third determining unit, and a first training unit. The first taking unit is configured for taking first anomaly feature vectors as a training set, and the number of the first anomaly feature vectors is a first preset threshold. The processing unit is configured for performing a data normalization process on the anomaly feature vectors in the training set. The third determining unit is configured for determining distances among the anomaly feature vectors in the training set after performing the data normalization process. The first training unit is configured for training the initial classification model according to the distances and the KNN algorithm, so as to obtain the plurality of initial classifiers.

In some embodiments, the process unit may include a mapping subunit, which is configured for mapping the anomaly feature vectors in the training set in a range between 0 and 1 with a most-valued normalization.

In some embodiments, the apparatus may further include a taking module, an inputting module, a determining module, a judging module, a third acquiring module, and a third training module. The taking module is configured for taking second anomaly feature vectors as a testing set, and the number of the second anomaly feature vectors is a second preset threshold. The inputting module is configured for inputting the testing set into the plurality of initial classifiers, respectively, to obtain a classification result corresponding to each initial classifier. The determining module is configured for determining an accuracy rate of the classification result corresponding to each initial classifier. The judging module is configured for determining whether the accuracy rate of the classification result corresponding to each initial classifier is greater than a third preset threshold. The third acquiring module is configured for acquiring first initial classifiers corresponding to which the accuracy rate is not greater than the third preset threshold, when the accuracy rate of the classification result corresponding to each initial classifier is not greater than the third preset threshold. The third training module is configured for training the first initial classifiers according to the distances and the KNN algorithm.

In some embodiments, the second training module 44 may include a second taking unit, a calculating unit, a fourth determining unit, a second training unit, and an inputting unit. The second taking unit is configured for taking third anomaly feature vectors as a training group, and the number of the third anomaly feature vectors is a fourth preset threshold. The calculating unit is configured for inputting the training group into the plurality of initial classifiers, respectively, to calculate an error of each initial classifier. The fourth determining unit is configured for determining a weight of each initial classifier according to the error of each initial classifier. The second training unit is configured for training the initial classifiers corresponding to the weight according to the weight of each initial classifier until convergence. The inputting unit is configured for inputting the initial classifiers after training into the Adaboost classification model, so as to obtain an Adaboost classifier.

In some embodiments, the fourth determining unit may include an initializing subunit, an assigning subunit, and a determining subunit. The initializing subunit is configured for initializing each initial classifier. The assigning subunit is configured for assigning preset values to each initial classifier after initialization, respectively. The determining subunit is configured for determining the weight of each initial classifier according to the error of each initial classifier.

It should be noted that the above modules may be a functional module or a program module, and may be implemented either by software or by hardware. For modules implemented by hardware, the above modules may be located in the same processor, or the above modules may be located in different processors in any combination.

The present disclosure may further provides an electronic apparatus, including a processor and a memory that stores a computer program running on the processor, and the computer program may be executed by the processor to implement the steps of the above network traffic anomaly detection method.

Alternatively, the above electronic apparatus may further include a transmission device and an input/output device, which are connected to the processor, respectively.

Alternatively, in the present embodiment, the processor is configured to perform the following step 201 to step 205 via the computer program.

Step 201 includes acquiring a plurality of segments of traffic data in different monitoring states.

Step 202 includes acquiring an anomaly feature vector from the plurality of segments of traffic data.

Step 203 includes training an initial classification model according to the anomaly feature vector and on a basis of a KNN algorithm, so as to obtain a plurality of initial classifiers.

Step 204 includes training an initial Adaboost classification model according to the anomaly feature vector and the plurality of initial classifiers and on a basis of an Adaboost algorithm, so as to obtain an Adaboost classifier.

Step 205 includes classifying collected traffic data via the Adaboost classifier.

It should be noted that specific examples in the embodiment may be referred to the examples described in the above embodiments and alternative embodiments, which will not be repeated herein.

In addition, in conjunction with the network traffic anomaly detection methods in the above embodiments, the present disclosure may provide a storage medium to implement the network traffic anomaly detection methods. The storage medium has stored a computer program, and the computer program is executed by a processor to implement any of the network traffic anomaly detection methods in the above embodiments.

It should be understood by those skilled in the art that the technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A network traffic anomaly detection method, comprising:

acquiring a plurality of segments of traffic data in different monitoring states;

acquiring an anomaly feature vector from the plurality of segments of traffic data;

training an initial classification model according to the anomaly feature vector and on a basis of a KNN algorithm, so as to obtain a plurality of initial classifiers;

training an initial Adaboost classification model according to the anomaly feature vector and the plurality of initial classifiers and on a basis of an Adaboost algorithm, so as to obtain an Adaboost classifier; and classifying collected traffic data via the Adaboost classifier;

the training the initial classification model according to the anomaly feature vector and on the basis of the KNN algorithm, so as to obtain the plurality of initial classifiers further comprises:

taking first anomaly feature vectors as a training set, wherein the number of the first anomaly feature vectors is a first preset threshold;

performing a data normalization process on the anomaly feature vectors in the training set;

determining distances among the anomaly feature vectors in the training set after performing the data normalization process; and training the initial classification model according to the distances and the KNN algorithm, so as to obtain the plurality of initial classifiers; and after the training the initial classification model according to the distances and the KNN algorithm, so as to obtain the plurality of initial classifiers, the method further comprises:

taking second anomaly feature vectors as a testing set, wherein the number of the second anomaly feature vectors is a second preset threshold;

inputting the testing set into the plurality of initial classifiers, respectively, to obtain a classification result corresponding to each initial classifier;

determining an accuracy rate of the classification result corresponding to each initial classifier;

determining whether the accuracy rate of the classification result corresponding to each initial classifier is greater than a third preset threshold, if no, acquiring first initial classifiers corresponding to which the accuracy rate is not greater than the third preset threshold; and training the first initial classifiers according to the distances and the KNN algorithm.

2. The network traffic anomaly detection method of claim 1, wherein the acquiring the anomaly feature vector from the plurality of segments of traffic data further comprises:

determining and flagging traffic anomaly data in the plurality of segments of traffic data;

determining feature data of the traffic anomaly data after being flagged; and generating the anomaly feature vector from the plurality of segments of traffic data according to the feature data.

3. The network traffic anomaly detection method of claim 1, wherein the performing the data normalization process on the anomaly feature vectors in the training set further comprises:

mapping the anomaly feature vectors in the training set in a range between 0 and 1 with a most-valued normalization.

4. The network traffic anomaly detection method of claim 1, wherein the training the initial Adaboost classification model according to the anomaly feature vector and the plurality of initial classifiers and on the basis of the Adaboost algorithm, so as to obtain the Adaboost classifier further comprises:

taking third anomaly feature vectors as a training group, wherein the number of the third anomaly feature vectors is a fourth preset threshold;

inputting the training group into the plurality of initial classifiers, respectively, to calculate an error of each initial classifier;

determining a weight of each initial classifier according to the error of each initial classifier;

training the initial classifiers corresponding to the weight according to the weight of each initial classifier until convergence; and inputting the initial classifiers after training into the Adaboost classification model, so as to obtain an Adaboost classifier.

5. The network traffic anomaly detection method of claim 4, wherein the determining the weight of each initial classifier according to the error of each initial classifier further comprises:

initializing each initial classifier;

assigning preset values to each initial classifier after initialization, respectively; and determining the weight of each initial classifier according to the error of each initial classifier.

6. A non-transitory electronic apparatus, comprising a processor and a memory that stores a computer program running on the processor, wherein the computer program is executed by the processor to implement the steps of the network traffic anomaly detection method of claim 1.

7. The non-transitory electronic apparatus of claim 6, wherein the acquiring the anomaly feature vector from the plurality of segments of traffic data comprises:

determining and flagging traffic anomaly data in the plurality of segments of traffic data;

determining feature data of the traffic anomaly data after being flagged; and generating the anomaly feature vector from the plurality of segments of traffic data according to the feature data.

8. The non-transitory electronic apparatus of claim 6, wherein the performing the data normalization process on the anomaly feature vectors in the training set further comprises:

mapping the anomaly feature vectors in the training set in a range between 0 and 1 with a most-valued normalization.

9. The non-transitory electronic apparatus of claim 6, wherein the training the initial Adaboost classification model according to the anomaly feature vector and the plurality of initial classifiers and on the basis of the Adaboost algorithm, so as to obtain the Adaboost classifier further comprises:

taking third anomaly feature vectors as a training group, wherein the number of the third anomaly feature vectors is a fourth preset threshold;

inputting the training group into the plurality of initial classifiers, respectively, to calculate an error of each initial classifier;

determining a weight of each initial classifier according to the error of each initial classifier;

training the initial classifiers corresponding to the weight according to the weight of each initial classifier until convergence; and inputting the initial classifiers after training into the Adaboost classification model, so as to obtain an Adaboost classifier.

10. The non-transitory electronic apparatus of claim 9, wherein the determining the weight of each initial classifier according to the error of each initial classifier comprises:

initializing each initial classifier;

assigning preset values to each initial classifier after initialization, respectively; and determining the weight of each initial classifier according to the error of each initial classifier.

11. A non-transitory storage medium having stored a computer program, wherein the computer program is executed by a processor to implement the steps of the network traffic anomaly detection method of claim 1.

12. The non-transitory storage medium of claim 11, wherein the acquiring the anomaly feature vector from the plurality of segments of traffic data comprises:

determining and flagging traffic anomaly data in the plurality of segments of traffic data;

determining feature data of the traffic anomaly data after being flagged; and generating the anomaly feature vector from the plurality of segments of traffic data according to the feature data.

13. The non-transitory storage medium of claim 11, wherein the performing the data normalization process on the anomaly feature vectors in the training set further comprises:

mapping the anomaly feature vectors in the training set in a range between 0 and 1 with a most-valued normalization.

\* \* \* \* \*